(12) United States Patent
Lee

(10) Patent No.: US 10,585,187 B2
(45) Date of Patent: Mar. 10, 2020

(54) AUTOMOTIVE RADAR WITH END-FIRE ANTENNA FED BY AN OPTICALLY GENERATED SIGNAL TRANSMITTED THROUGH A FIBER SPLITTER TO ENHANCE A FIELD OF VIEW

(71) Applicant: Toyota Motor Engineering & Manufacturing North America, Inc., Erlanger, KY (US)

(72) Inventor: Jae Seung Lee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 392 days.

(21) Appl. No.: 15/442,548

(22) Filed: Feb. 24, 2017

(65) Prior Publication Data

US 2018/0246203 A1    Aug. 30, 2018

(51) Int. Cl.
*G01S 13/93* (2020.01)
*G01S 17/93* (2020.01)
(Continued)

(52) U.S. Cl.
CPC .......... *G01S 13/931* (2013.01); *G01S 7/032* (2013.01); *G01S 13/865* (2013.01);
(Continued)

(58) Field of Classification Search
None
See application file for complete search history.

(56) References Cited

U.S. PATENT DOCUMENTS 4,298,873 A   11/1981 Roberts
4,414,550 A   11/1983 Tresselt
(Continued)

FOREIGN PATENT DOCUMENTS

CN      104122556      10/2014
DE      102013100554    1/2013
(Continued)

OTHER PUBLICATIONS

Li et al. "Dual-Beam Steering Microstrip Leaking Wave Antenna with Fixed Operating Frequency" IEEE Transactions on Antennas and Propagation; vol. 56, No. 1, pp. 248-252, Jan. 2008.
(Continued)

*Primary Examiner* — Whitney Moore
(74) *Attorney, Agent, or Firm* — Snell & Wilmer LLP

(57) ABSTRACT

A vehicular radar system includes an optical source designed to output an optical signal. The vehicular radar system further includes a first optical splitter coupled to the optical source and designed to split the optical signal into a first duplicate signal and a second duplicate signal. The vehicular radar system further includes at least one converter coupled to the first optical splitter and designed to convert the first duplicate signal and the second duplicate signal into a first radar signal and a second radar signal, respectively. The vehicular radar system further includes a first antenna coupled to the at least one converter and designed to transmit the first radar signal, and a second antenna coupled to the at least one converter and designed to transmit the second radar signal.

20 Claims, 10 Drawing Sheets

(51) Int. Cl.

| | | |
|---|---|---|
| *G01S 7/03* | (2006.01) | |
| *H01Q 1/32* | (2006.01) | |
| *H01Q 3/26* | (2006.01) | |
| *H01Q 13/08* | (2006.01) | |
| *G01S 13/86* | (2006.01) | |
| *H01Q 21/06* | (2006.01) | |
| *H01Q 21/20* | (2006.01) | |
| *G01S 13/931* | (2020.01) | |

(52) U.S. Cl.
CPC ......... *G01S 17/936* (2013.01); *H01Q 1/3233* (2013.01); *H01Q 3/2676* (2013.01); *H01Q 13/085* (2013.01); *H01Q 21/067* (2013.01); *H01Q 21/205* (2013.01); *G01S 2013/9375* (2013.01); *G01S 2013/9378* (2013.01); *H01Q 1/3283* (2013.01)

(56) References Cited

U.S. PATENT DOCUMENTS

| | | |
|---|---|---|
| 5,023,623 A | 6/1991 | Kreinheder et al. |
| 5,023,624 A | 6/1991 | Heckaman et al. |
| 5,227,808 A | 7/1993 | Davis |
| 5,400,042 A | 3/1995 | Tulintseff |
| 5,486,832 A | 1/1996 | Hulderman |
| 5,557,291 A | 9/1996 | Chu et al. |
| 5,767,793 A | 6/1998 | Agravante et al. |
| 5,872,542 A | 2/1999 | Simons et al. |
| 5,874,915 A | 2/1999 | Lee et al. |
| 5,940,011 A | 8/1999 | Agravante et al. |
| 6,046,703 A | 4/2000 | Wang et al. |
| 6,061,035 A | 5/2000 | Kinasewitz et al. |
| 6,154,176 A | 11/2000 | Fathy et al. |
| 6,317,094 B1 | 11/2001 | Wu et al. |
| 6,366,254 B1 | 4/2002 | Sievenpiper et al. |
| 6,496,151 B1 | 12/2002 | Ferreri et al. |
| 6,496,155 B1 | 12/2002 | Sievenpiper et al. |
| 6,549,170 B1 | 4/2003 | Kuo et al. |
| 6,624,845 B2 | 9/2003 | Loyd et al. |
| 6,815,739 B2 | 11/2004 | Huff et al. |
| 6,950,062 B1 | 9/2005 | Mather et al. |
| 7,109,938 B2 | 9/2006 | Franson et al. |
| 7,170,446 B1 | 1/2007 | West et al. |
| 7,268,732 B2 | 9/2007 | Gotzig et al. |
| 7,411,542 B2 | 8/2008 | O'Boyle |
| 7,532,170 B1 | 5/2009 | Lee et al. |
| 7,728,772 B2 | 6/2010 | Mortazawi et al. |
| 7,742,004 B2 | 6/2010 | Fukushima et al. |
| 7,821,355 B2 | 10/2010 | Engel et al. |
| 7,924,226 B2 | 4/2011 | Soler Castany et al. |
| 8,175,512 B2 | 5/2012 | Cornwell |
| 8,259,032 B1 | 9/2012 | Buckley |
| 8,319,678 B2 | 11/2012 | Weiss |
| 8,405,468 B2 | 3/2013 | Uchaykin |
| 8,576,111 B2 | 11/2013 | Smith et al. |
| 8,604,991 B2 | 12/2013 | Nagayama |
| 8,836,592 B2 | 9/2014 | Paulus et al. |
| 8,902,117 B2 | 12/2014 | Ohno et al. |
| 8,912,968 B2 | 12/2014 | Sharma et al. |
| 8,922,448 B2 | 12/2014 | Wong et al. |
| 8,952,678 B2 | 2/2015 | Giboney |
| 9,013,365 B2 | 4/2015 | Lee et al. |
| 9,065,163 B1 | 6/2015 | Wu et al. |
| 9,142,889 B2 | 9/2015 | Pazin et al. |
| 9,214,739 B2 | 12/2015 | Sover et al. |
| 9,225,058 B2 | 12/2015 | DeVries et al. |
| 9,337,542 B2 | 5/2016 | Coburn et al. |
| 9,397,740 B2 | 7/2016 | Maltsev et al. |
| 2005/0225481 A1 | 10/2005 | Bonthron |
| 2006/0044189 A1 | 3/2006 | Livingston et al. |
| 2008/0225375 A1* | 9/2008 | Newberg ............... G02B 6/122 359/279 |
| 2012/0194377 A1 | 8/2012 | Yukumatsu et al. |
| 2012/0235881 A1 | 9/2012 | Pan et al. |
| 2012/0295015 A1 | 11/2012 | Yang |
| 2013/0076579 A1 | 3/2013 | Zhang et al. |
| 2013/0201076 A1 | 8/2013 | Vos et al. |
| 2014/0070994 A1 | 3/2014 | Schmalenberg et al. |
| 2014/0266902 A1 | 9/2014 | Kamgaing et al. |
| 2015/0070228 A1 | 3/2015 | Gu et al. |
| 2015/0130673 A1 | 5/2015 | Ng et al. |
| 2015/0268336 A1 | 9/2015 | Yukumatsu et al. |
| 2016/0033638 A1 | 2/2016 | Silc |
| 2016/0125713 A1 | 5/2016 | Blech et al. |
| 2017/0307751 A1* | 10/2017 | Rohani ................ G01S 13/865 |

FOREIGN PATENT DOCUMENTS

| | | |
|---|---|---|
| WO | WO 01/52352 | 7/2001 |
| WO | WO 2009/092695 | 7/2009 |
| WO | WO 2012/076994 | 6/2012 |
| WO | WO 2014/184554 | 11/2014 |

OTHER PUBLICATIONS

Harvey et al. "Spatial Power Combining for High-Power Transmitters" Microwave; pp. 48-59; Dec. 2000.

Larumbe-Gonzalo et al. "Coherently Fed Frequency Scanning Phased Array Structure for Imaging Applications" 6th European Conference on Antennas for Propagation (EUCAP) IEEE; pp. 2802-2806; 2011.

Ramadurgakar "X Band Substrate Integrated Horn Array Antenna for Future Advanced Collison Avoidance System" 133 pages; 2015.

Djerafi, et al.; "*Innovative Multilayered Millemetre-Wave Antennas for Multi-Dimensional Scanning and Very Small Footprint Applications*"; 6*th* European Conference on Antennas and Propagation (EUCAP); pp. 2583-2587; Mar. 26, 2012.

Ye et al.; "*A Dual-Band Printed End-Fire antenna with DSPSL Feeding*" 6 pages; Dec. 17, 2015.

Amadjikpè et al.; "*Integrated 60-GHz Antenna on Multilayer Organic Package with Broadside and End-Fire Radiation*" IEEE Transactions on Microwave Theory and Techniques, vol. 61, No. 1, pp. 303-315; Jan. 2013.

Litzenberger et al.; "*Study of Waveguide Antenna Implemented in Laminated Material*" Dec. 2002.

Schoenlinner, Bernhard; "*Compact Wide Scan-Angle Antennas for Automotive Applications and RF MEMS Switchable Frequency-Selective Surfaces*" 2014; 190 pages.

Tahim et al.; "*Multi-Band Antenna Technology*"; Antennas and Propagation Society International Symposium, 2004. IEEE, vol. 4; pp. 3968-3971; Jun. 20, 2004.

Beer et al.; "*Novel Antenna Concept for Compact Millimeter-Wave Automotive Radar Sensors*"; IEEE Antennas and Wireless Propagation Letters, vol. 8; pp. 771-774; Jul. 7, 2009.

Choukiker et al.; "*Hybrid Fractal Shape Planar Monopole Antenna Covering Multiband Wireless Communication with MIMO Implementation for Handheld Mobile Devices*"; IEEE Transactions on Antennas and Propagation, vol. 62, No. 3; pp. 1483-1488; Dec. 17, 2013.

Li et al.; "*A Compact Wideband MIMO Antenna with Two Novel Bent Slits*"; IEEE Transactions on Antennas and Propagation, vol. 60, No. 2; pp. 482-489; Feb. 2012.

Yang, et al.; "*Dual Band-Notched Ultrawideband MIMO Antenna Array*"; Wireless Symposium (IWS), 2013 IEEE International; 4 pages; Apr. 18, 2013.

Shamsinejad et al.; "*Microstrip-Fed 3-D Folded Slot Antenna on Cubic Structure*"; IEEE Antennas and Wireless Propagation Letters, vol. 15; pp. 1081-1084; 2016.

Li, Yuan; "*Development of Micromachined Millimeter Wave Modules for Wireless Communication Systems*"; Georgia Institute of Technology; 128 pages; Aug. 2010.

Bisognin et al.; "*3D Printed Plastic 60 GHz Lens: Enabling Innovative Millimeter Wave antenna Solution and System*"; 2014 IEEE MTT-S International Microwave Symposium (IMS2014); 4 pages; Jun. 1, 2014.

(56) References Cited

OTHER PUBLICATIONS

Jansen et al.; "*Antenne Design for 24 GHz and 60 GHz Emerging Microwave Applications*"; Koninklijke Philips Electronics N.V. 2006; 137 pages; Jul. 2006.
Dhiman et al.; "*Effect of DGS Technique in MIMO Antenna*"; International Journal of Current Engineering and Technology; vol. , No. 5 pp. 3138-3141; Oct. 2015.
Schwering, Felix K.; "*Millimeter Wave Antennas*"; Proceedings of the IEEE, vol. 80, No. 1; pp. 92-102; Jan. 1992.
Yuan, Z.-X. et al.; "*Multiband Printed and Double-Sided Dipole Antenna for WLAN/WiMAX Applications*"; Microwave and Optical Technology Letters, vol. 54, No. 4, Apr. 2012; 4 pages.

\* cited by examiner

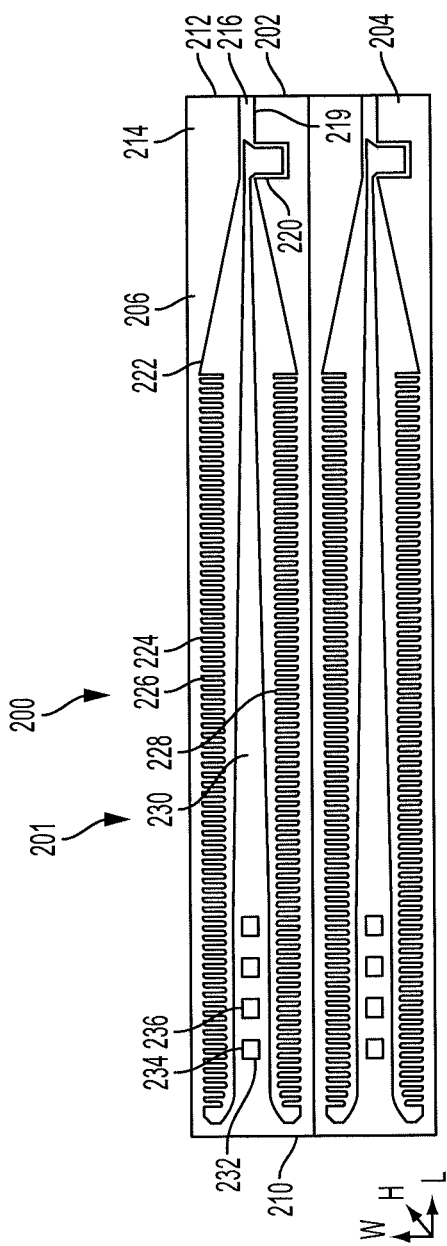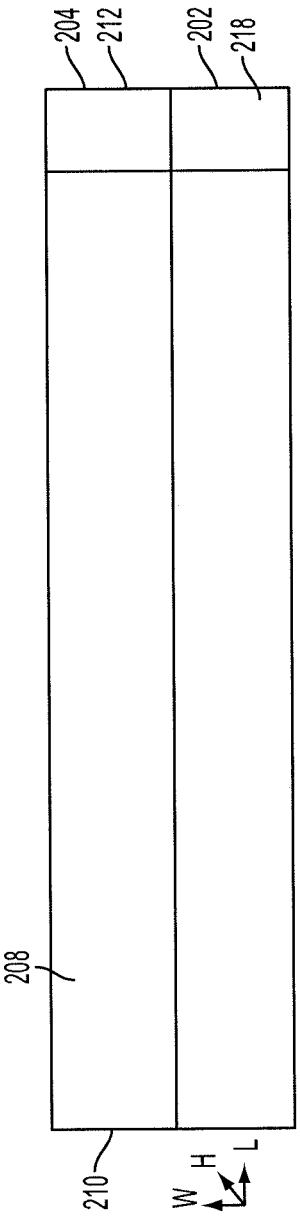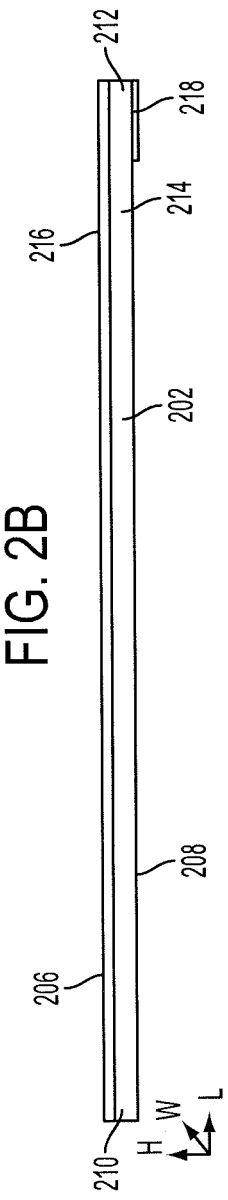
FIG. 2A
FIG. 2B
FIG. 2C

AUTOMOTIVE RADAR WITH END-FIRE ANTENNA FED BY AN OPTICALLY GENERATED SIGNAL TRANSMITTED THROUGH A FIBER SPLITTER TO ENHANCE A FIELD OF VIEW

BACKGROUND

1. Field

The present disclosure relates to vehicular radar systems and, in particular, to a vehicular radar system that generates multiple radar signals based on an optical signal from a single optical source.

2. Description of the Related Art

Vehicle functionality is increasing at a rapid rate. For example, many vehicle manufacturers are beginning to incorporate fully autonomous and semi-autonomous functions into vehicles. The increase in functionality incorporated in turn results in an increase in hardware positioned in, on, and around vehicles. Accordingly, as vehicle manufacturers include more functionality and hardware, it is desirable for each item of hardware to require a relatively small amount of space.

Some vehicle manufacturers are currently designing fully autonomous and semi-autonomous vehicles that can drive themselves from a starting location to a destination location. Some other vehicles include collision avoidance features that may warn a driver and/or control operations of a vehicle when detected data indicates that the vehicle may collide with another object or vehicle. Algorithms for these autonomous and semi-autonomous vehicle features are based on the detection of objects in the vicinity of the vehicle, such as street signs, other vehicles, people, and the like. Many vehicles incorporate multiple vehicular radar systems to detect such objects.

Vehicular radar systems may each include multiple antennas along with one or more radio frequency integrated circuit (RFIC) chips that transmit radar signals to the antennas for transmission into the environment. Such a system may undesirably utilize multiple relatively large signal generators such as microwave oscillators. In particular, a separate microwave oscillator may be utilized on each printed circuit board (PCB) that contains antennas. Even if a single microwave oscillator is used to transfer signals to multiple PCBs, it may be desirable for the PCBs to be relatively close to the microwave oscillator because radar signals (which may have a frequency of approximately 77 GHz) undesirably experience delay when transmitted over relatively large distances.

Accordingly, it is desirable for vehicular radar systems to be provided in relatively small packages.

SUMMARY

Described herein is a vehicular radar system. The vehicular radar system includes an optical source designed to output an optical signal. The vehicular radar system further includes a first optical splitter coupled to the optical source and designed to split the optical signal into a first duplicate signal and a second duplicate signal. The vehicular radar system further includes at least one converter coupled to the first optical splitter and designed to convert the first duplicate signal and the second duplicate signal into a first radar signal and a second radar signal, respectively. The vehicular radar system further includes a first antenna coupled to the at least one converter and designed to transmit the first radar signal, and a second antenna coupled to the at least one converter and designed to transmit the second radar signal.

Also described is a vehicular radar system. The vehicular radar system includes an optical source designed to output an optical signal. The vehicular radar system further includes a first optical splitter coupled to the optical source and designed to split the optical signal into a first duplicate signal and a second duplicate signal. The vehicular radar system further includes a phase shifter coupled to the first optical splitter and designed to shift a phase of the first duplicate signal such that the first duplicate signal has a different phase than the second duplicate signal. The vehicular radar system further includes at least one converter coupled to the first optical splitter and the phase shifter and designed to convert the first duplicate signal that is phase-shifted and the second duplicate signal into a first radar signal and a second radar signal, respectively. The vehicular radar system further includes a first antenna array coupled to the at least one converter and designed to transmit a first radar beam including the first radar signal and the second radar signal.

Also described is a vehicular radar system. The vehicular radar system includes an optical source designed to output an optical signal. The vehicular radar system also includes a first optical splitter coupled to the optical source and designed to split the optical signal into a first duplicate signal and a second duplicate signal. The vehicular radar system also includes a phase shifter coupled to the first optical splitter and designed to shift a phase of the first duplicate signal such that the first duplicate signal has a different phase than the second duplicate signal. The vehicular radar system also includes a second optical splitter coupled to the phase shifter and designed to split the first duplicate signal that is phase-shifted into a first pair of optical signal copies. The vehicular radar system also includes a third optical splitter designed to split the second duplicate signal into a second pair of optical signal copies. The vehicular radar system also includes at least one converter coupled to the second optical splitter and to the third optical splitter and designed to convert the first pair of optical signal copies to a first pair of radar signal copies and to convert the second pair of optical signal copies into a second pair of radar signal copies. The vehicular radar system also includes a first antenna array coupled to the at least one converter and designed to transmit a first radar beam including one of the first pair of radar signal copies and one of the second pair of radar signal copies, and a second antenna array coupled to the at least one converter and designed to transmit a second radar beam including another of the first pair of radar signal copies and another of the second pair of radar signal copies.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 2A is a drawing showing a top view of two end-fire antennas of an end-fire antenna array according to an embodiment of the present invention;

FIG. 2B is a drawing showing a bottom view of the end-fire antenna array of FIG. 2A according to an embodiment of the present invention;

FIG. 2C is a drawing showing a side view of the end-fire antenna array of FIG. 2A according to an embodiment of the present invention;

DETAILED DESCRIPTION

The present invention provides a vehicular radar system that includes multiple radar antennas that each transmits a radar signal generated from an optical signal. In particular, the vehicular radar system includes an optical source for generating the optical signal and a first optical splitter that splits the optical signal into multiple duplicate signals. The vehicular radar system further includes a plurality of phase shifters that each receives one of the duplicate signals and shifts a phase of the corresponding duplicate signal by an amount that is different than the other phase shifters. Secondary optical splitters may split each phase-shifted duplicate signal into multiple optical signal copies, which are then transmitted over fiber-optic lines to antenna arrays. Converters are positioned between the secondary optical splitters and the antenna arrays and convert the optical signal copies into radar signals which are transmittable by the antennas.

The vehicular radar systems disclosed herein may be advantageously formed into a smaller package than vehicular radar systems that utilize a microwave oscillator due to the relatively small size of optical components. Furthermore, signals generated by optical sources beneficially generate a low amount of phase noise relative to signals generated by microwave oscillators. Another advantage provided by the vehicular radar systems is that fiber-optic lines are relatively lossless, meaning that an optical source may be positioned at a relatively large distance from a converter without degradation of signal quality or introduction of undesired phase shifts. This provides the advantage of allowing a single optical source to be used to generate radar signals for antennas positioned at various locations on a vehicle. Likewise, optical signals may be split by optical splitters with relatively low loss, beneficially allowing the single optical signal to be distributed to a relatively large quantity of antennas while experiencing relatively low signal degradation.

Figure 1:
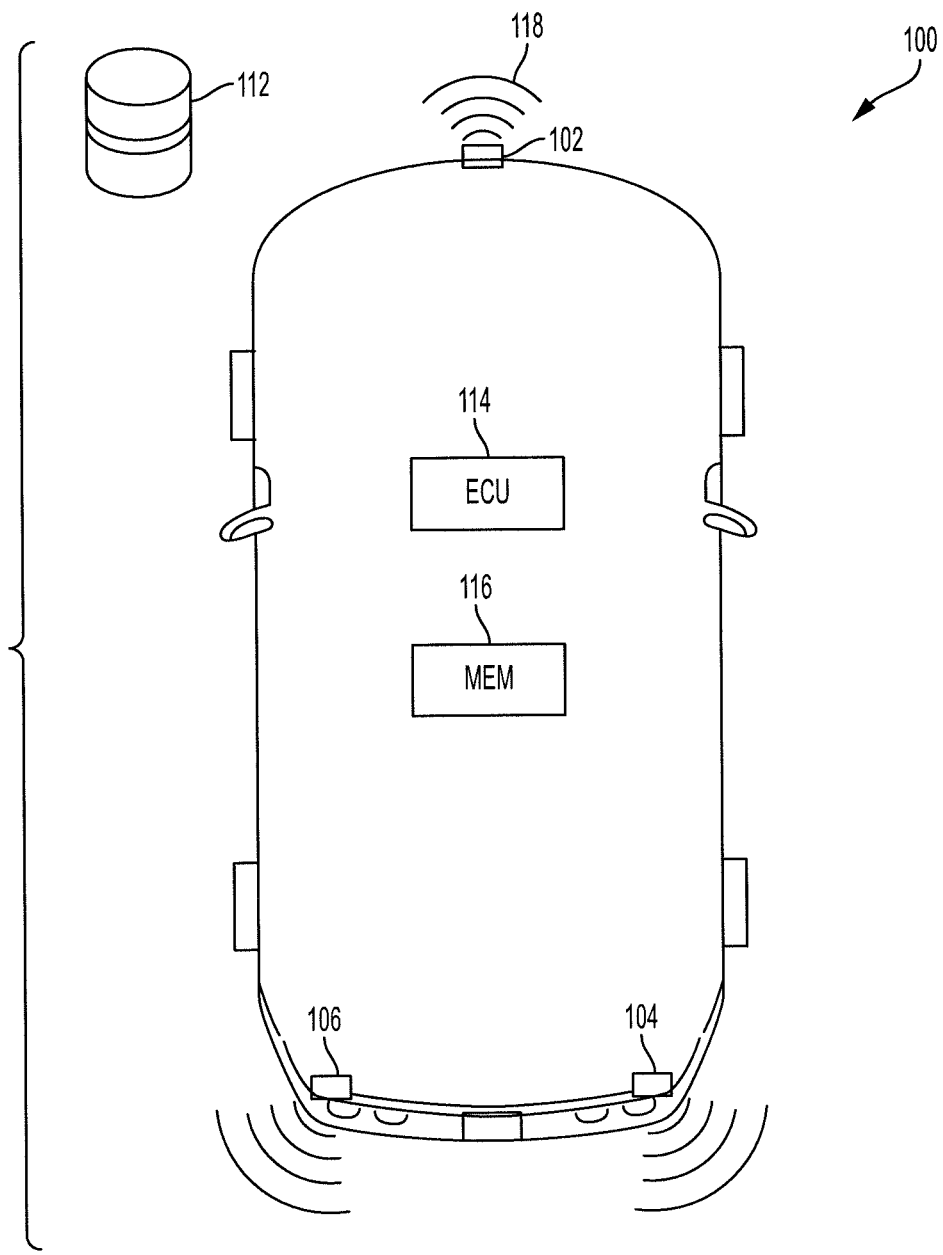
FIG. 1 is a drawing of a vehicle having multiple vehicular radar systems for sensing objects in an environment of the vehicle according to an embodiment of the present invention.

Turning to FIG. 1, a vehicle 100 having radar sensing capabilities is shown. The vehicle 100 includes a first vehicular radar system 102, a second vehicular radar system 104, and a third vehicular radar system 106. Each of the vehicular radar systems 102, 104, 106 may detect data corresponding to characteristics of objects around the vehicle 100 such as a distance to the object, a size of the object, or the like. For example, the vehicular radar system 102 may transmit a signal or a beam 118. The beam 118 may reflect off of an object 112 and propagate back towards the vehicular radar system 102. The vehicular radar system 102 may receive the reflected signal and determine characteristics of the object 112 based on the received reflection of the signal.

It is desirable for the vehicular radar systems 102, 104, 106 to detect objects at multiple ranges. As will be described with greater detail below, the vehicular radar systems 102, 104, 106 have been designed to include multiple antenna arrays, some of which may have a greater quantity of antennas and/or a greater spacing between antennas than others for detecting objects within various ranges.

It is also desirable for each of the vehicular radar systems 102, 104, 106 to detect volumetric, or three-dimensional (3D), data corresponding to objects in the environment. As will also be described with greater detail below, the vehicular radar systems 102, 104, 106 have been designed to have multiple antennas of a particular type positioned adjacent to each other in two directions to provide for volumetric scanning.

The vehicle 100 may also include an electronic control unit (ECU) 114 and a memory 116. In some embodiments, the ECU 114 may include a logic device, such as a processor, a microprocessor, a FPGA, or the like, specifically designed to perform functions that correspond to operations of the vehicle 100. The memory 116 may include any non-transitory memory capable of storing data. For example, the memory 116 may store instructions to be performed by the ECU 114, may store data usable by the ECU 114 to control operation of the vehicle 100, or the like.

The ECU 114 may be coupled to each of the vehicular radar systems 102, 104, 106. The ECU 114 may receive radar data corresponding to objects in the environment. The ECU 114 may determine the presence of, and characteristics of, an object based on the radar data. For example, the ECU 114 may determine that the object 112 is 5 feet away from the vehicle 100 and has a height of 3 feet based on the radar data.

Turning now to FIGS. 2A, 2B, and 2C, a top view, a bottom view, and a side view, respectively, of an end-fire antenna array 200 are shown. The end-fire antenna array 200 may be included in a vehicular radar system 201. An L-W-H axis is shown in various drawings to illustrate directions corresponding to a length, a width, and a height of the vehicular radar system 201. Although features are described with reference to the length, the width, and the height, one skilled in the art will realize that the vehicular radar system 201 may be oriented in any direction such that, for example, a height may be referred to as a length and so forth.

The end-fire antenna array 200 has a plurality of end-fire antennas including a first end-fire antenna 202 and a second end-fire antenna 204. In some embodiments, the antenna array 200 may include between 2 and 32 end-fire antennas.

The antenna array 200, and thus the first antenna 202 and the second antenna 204, has a top 206 and a bottom 208. The terms top and bottom are used for reference only. One skilled in the art will realize that the top 206 and the bottom 208 of the antenna array 200 may be oriented in any direction.

The first antenna 202 may include a metal 216 inside of or on a PCB 214. The metal 216 may be, for example, a metal trace printed on the PCB 214. The first antenna 202 includes a transmission end 210 and a chip connection end 212. The transmission end 210 is an end of the first antenna 202 from which signals propagate into the atmosphere. The chip connection end 212 is an end of the first antenna 202 from which a signal propagates from an RFIC chip towards the first antenna 202.

A signal from a controller, such as an RFIC designed to transmit signals in a radio frequency, may be received by the first antenna 202 at the chip connection end 212. The signal may propagate through the first antenna 202 towards the transmission end 210. From the transmission end, the signal may be wirelessly transmitted into the atmosphere in the longitudinal direction (i.e., in the negative L direction).

Similarly, a wireless signal (such as a signal reflected off of an object) may be received by the first antenna 202 at the transmission end 210 and may propagate through the first antenna 202 to the chip connection end 212. The signal may then be received by the controller and analyzed by the controller to determine features of the object from which it was reflected.

The metal 216 of the first antenna 202 may include tin, gold, nickel, any other conductive metal, or any combination thereof. The metal 216 on the bottom 208 of the first antenna 202 may form a ground structure 218. The ground structure 218 may be electrically isolated from the metal 216 on the top 206 of the first antenna 202 and may be connected to an electrical ground. In some embodiments, the first antenna 202 may not include a ground structure, or the ground structure may be positioned elsewhere.

The metal 216 on the top 206 of the first antenna 202 may form an antenna structure including a chip connection lead 219, a balun 220, a tapered section 222, and a wave section 224. In some embodiments, the metal 216 on the top 206 of the first antenna 202 may also form one or more beam adjustment features 232 including a first beam adjustment feature 234 and a second beam adjustment feature 236. The first antenna 202 and the second antenna 204 may each be referred to as tapered slot end-fire antennas.

The chip connection lead 219 may be electronically connected to a controller, such as an RFIC, that controls operation of the antenna array 200.

The balun 220 may function as a transformer and convert an unbalanced signal to a balanced signal and/or may convert a balanced signal to an unbalanced signal.

The tapered section 222 is tapered from the wave section 224 to the balun 220. The converted signal may propagate through the tapered section 222 towards the wave section 224.

The wave section 224 may include a first wave section 226 and a second wave section 228 separated by a space 230. The design of the wave section 224 allows the signal propagating towards the transmission end 210 to continue to propagate beyond the wave section 224 in a wireless manner.

The beam adjustment features 232 may be included or adjusted to alter characteristics of a signal transmitted by the first antenna 202. The beam adjustment features 232 may be positioned within the space 230. The beam adjustment features 232 may have any shape such as the square shape that is shown, a triangular shape, a parallelogram shape, or the like. The beam adjustment features 232 may be electrically isolated from the other metal 216 on the top 206 of the first antenna 202 or may be in electrical contact with the other metal 216.

Figure 2D:
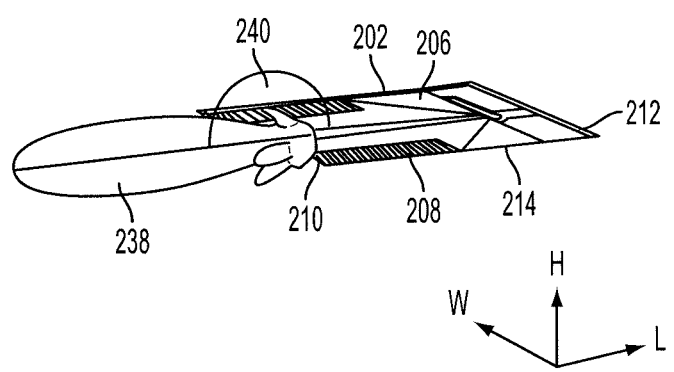
FIG. 2D is a drawing illustrating a shape of a radar beam transmitted by one of the end-fire antennas of FIG. 2A according to an embodiment of the present invention.

Turning to FIG. 2D, the first antenna 202 functions as an end-fire antenna because it transmits a signal or a beam 238 that propagates in a direction parallel to a longitudinal direction of the first antenna 202 (i.e., in the negative L direction). This is distinguished from a signal transmitted by a broadside antenna that propagates perpendicular to a longitudinal direction of an antenna (i.e., in the positive H direction).

Referring to FIGS. 2A and 2D, the beam adjustment features 232 may be varied to adjust characteristics of the beam 238. For example, a quantity of the beam adjustment features 232, a shape of the beam adjustment features 232, and/or dimensions of the beam adjustment features 232 may be selected to achieve desirable characteristics of the beam 238. In some embodiments, the quantity, the shape, and/or the dimensions of the beam adjustment features 232 may be selected in order for the beam 238 to form a desired angle 240 with the top 206 or the bottom 208 of the PCB 214.

Returning reference to FIGS. 2A, 2B, and 2C, bandwidths for automotive or vehicle radar systems may be about 80 gigahertz (GHz), such as between 75-85 GHz and more specifically between 77-79 GHz. Where used in this context, "about" refers to the referenced value plus or minus seven percent (7%). The end-fire antennas provide desirable characteristics at these bandwidths. The end-fire antennas may be positioned adjacent to each other, as shown in FIG. 2A, in order to form a beam that scans in two dimensions. Furthermore, because the signal propagates away from the antenna in the longitudinal direction, the end-fire antennas may be stacked on top of each other, allowing for a volumetric (three-dimensional) scan.

In order to obtain desirable antenna properties of signals having bandwidths in the automotive spectrum, the substrate of the antenna array 200 (i.e., the PCB 214) may be relatively thin. For example, the first antenna 202 (including the PCB 214) may have a height of 0.127 mm in the H direction, a width of 2.5 mm in the W direction, and a length of 10 mm to 30 mm in the L direction.

Figure 3:
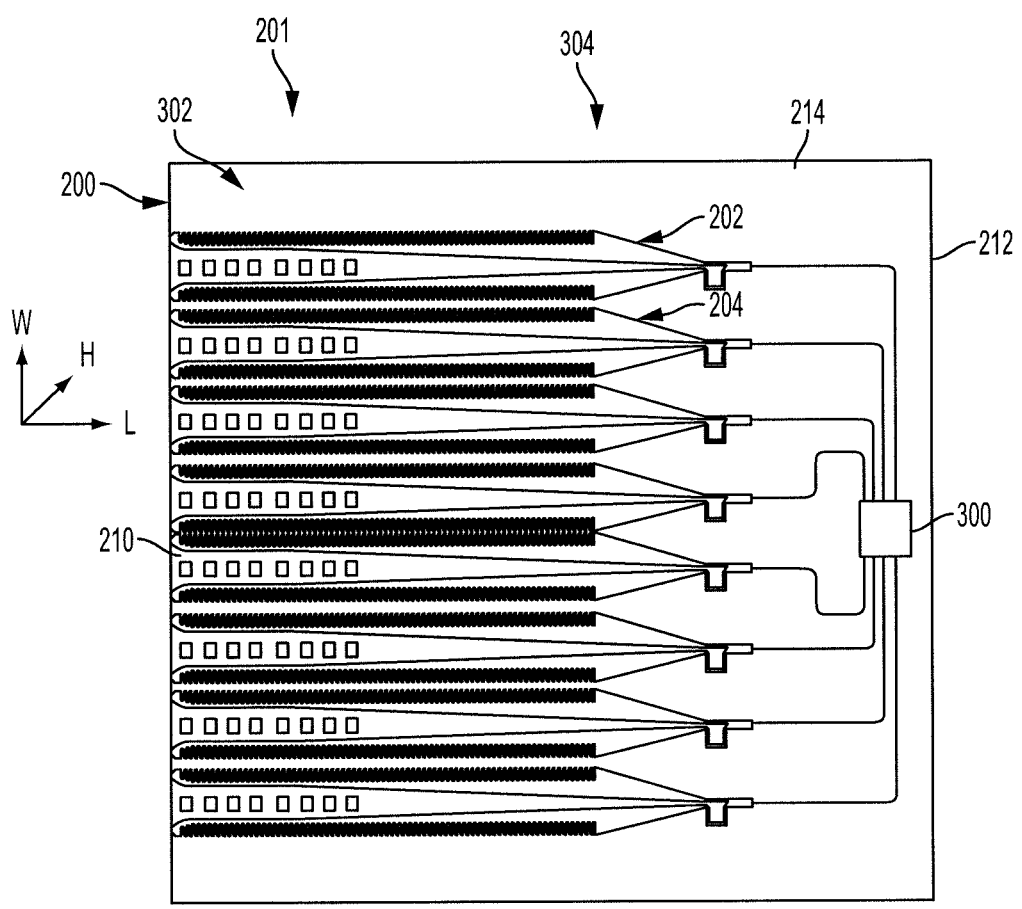
FIG. 3 is a drawing illustrating a radar subsystem having the end-fire antenna array of FIG. 2A and a radio frequency integrated circuit (RFIC) coupled to the end-fire antenna array according to an embodiment of the present invention.

Turning now to FIG. 3, a vehicular radar system 201 may include a vehicular radar board 304. The vehicular radar board 304 may include the end-fire antenna array 200 that includes a plurality of end-fire antennas 302. The vehicular radar board 304 may also include an RFIC chip 300. The RFIC chip 300 may be connected to each of the plurality of end-fire antennas 302 of the end-fire antenna array 200. The RFIC chip 300 may be connected to the PCB 214, and thus the plurality of end-fire antennas 302, in any of a variety of manners such as flip-chip bonding, wire bonding, or the like.

The RFIC chip 300 may control operation of each of the plurality of end-fire antennas 302. For example, the RFIC chip 300 may transmit a signal to each antenna of the plurality of end-fire antennas 302, which in turn may be wirelessly transmitted by the corresponding antenna.

The RFIC chip 300 may control the plurality of end-fire antennas 302 to transmit one or more radar beam. For example, at least some of the signals transmitted by the RFIC chip 300 to each of the plurality of end-fire antennas 302 may have a different phase. When the signals have a different phase and are transmitted into the atmosphere, the combined signals form a radar beam.

When the beam reaches an object away from the vehicular radar board 304, the beam may reflect from the object and travel towards the vehicular radar board 304. The reflected beam may be received by the end-fire antennas 302 and/or other end-fire antennas and may be transmitted from the antennas to the RFIC chip 300. In some embodiments, the RFIC chip 300 may analyze the received beam that was reflected from the object and determine characteristics of the object based on the reflected beam. In some embodiments, the RFIC chip 300 may relay the received beam to another processing unit, such as the ECU 114 of FIG. 1.

Because the antennas 302 of the vehicular radar board 304 are positioned in a linear manner with respect to each other, the vehicular radar board 304 may scan in two dimensions. When two or more two-dimensional radar boards are stacked such that antennas are positioned in two directions with respect to each other, the radar boards may together scan in three dimensions.

Figure 4:
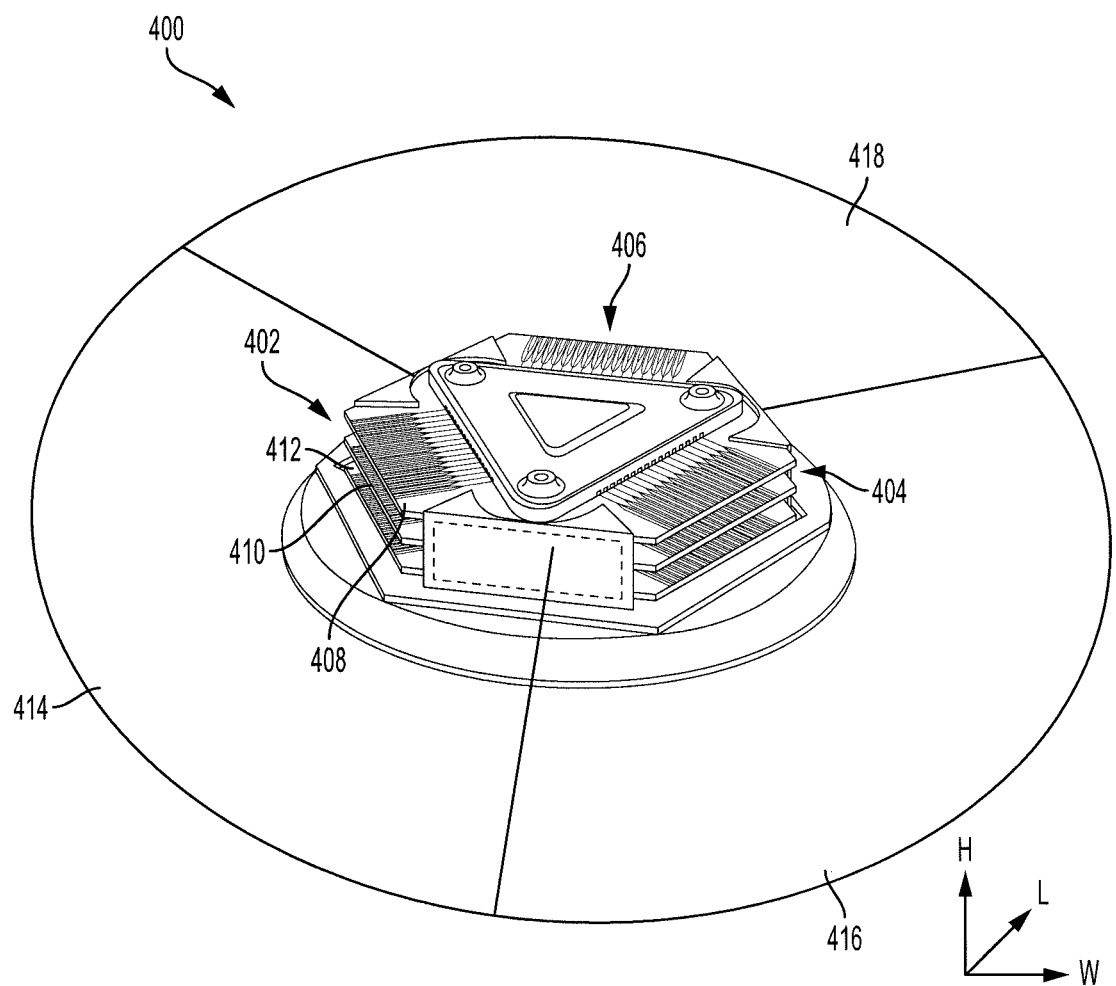
FIG. 4 is a drawing of a vehicular radar system having multiple sets of end-fire antenna arrays, each set including multiple antenna arrays stacked above each other for detecting three-dimensional data and each set being oriented in a different direction to increase a field of view of the vehicular radar system according to an embodiment of the present invention.

Turning now to FIG. 4, end-fire antennas provide advantages such as allowing a vehicular radar system 400 to be compact while still performing a volumetric scan, and to be compact while performing scanning in multiple directions. The vehicular radar system 400 includes a first set of end-fire antenna arrays 402, a second set of end-fire antenna arrays 404, and a third set of end-fire antenna arrays 406.

The first set of end-fire antenna arrays 402 includes a first antenna array 408, a second antenna array 410, and a third antenna array 412. The first antenna array 408 is stacked above the second antenna array 410, which is stacked above the third antenna array 412. In that regard, radar signals transmitted by each of the antenna arrays 408, 410, 412 may combine to form a volumetric radar beam that is capable of scanning in 3 dimensions.

Likewise, each of the second set of end-fire antenna arrays 404 and the third set of end-fire antenna arrays 406 may also transmit a volumetric radar beam. Furthermore, each of the first set of end-fire antenna arrays 402, the second set of end-fire antenna arrays 404, and the third set of end-fire antenna arrays 406 are oriented in different directions. In that regard, a volumetric radar beam transmitted by each of the sets of end-fire antenna arrays 402, 404, 406 may detect data in a different region. In particular, the first set of end-fire antenna arrays 402 may scan for objects within a first area 414, the second set of end-fire antenna arrays 404 may scan for objects within a second area 416, and the third set of end-fire antenna arrays 406 may scan for objects within a third area 418.

Figure 5A:
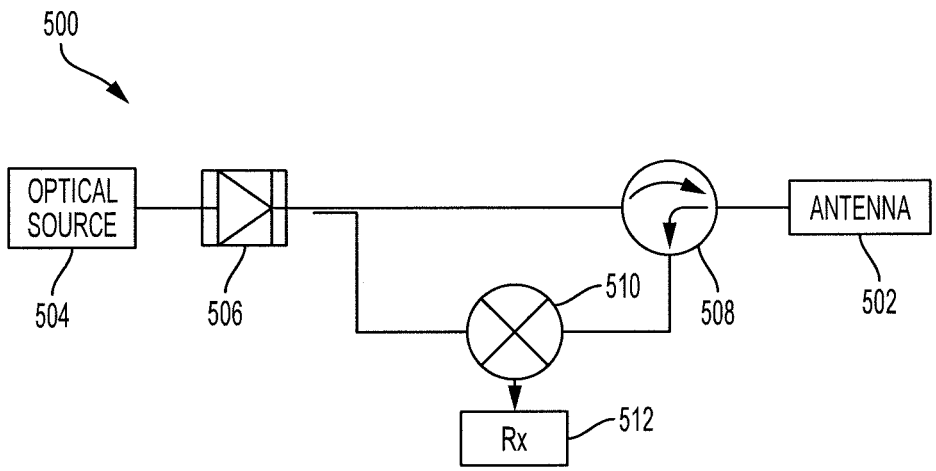
FIGS. 5A, 5B, and 5C are drawings illustrating various radar systems each designed to transmit a radar signal generated based on an optical signal from an optical source according to an embodiment of the present invention.

Turning now to FIG. 5A, a system 500 may be used to generate a radar signal (i.e., a microwave signal having a wavelength of one or more millimeter, usable to transmit a radar beam) using the light generated from an optical source 504. The optical source 504 may include, for example, a laser generator capable of outputting an optical laser. For example, the light generated by the optical source 504 may have a frequency along the order of $10^{14}$ hertz. The optical source 504 may generate a continuous wave signal or a pulse signal. The system 500 may be functional using either the continuous wave signal or the pulse signal. In some embodiments, it may be desirable for the optical source 504 to generate a pulse signal due to the relative ease of conversion of a pulse signal to a radar signal.

As the light signal is generated by the optical source 504, a converter 506 converts the light signal to a radar signal. For example, the converter 506 may convert a laser signal to a radar signal having a frequency of approximately 77 GHz.

A circulator 508 may receive the radar signal from the converter 506 and transmit the radar signal to an antenna 502. The antenna 502 may transmit the radar signal into the environment. The antenna 502 may further receive a reflection of the radar signal, which may flow through the circulator 508 towards a mixer 510. The circulator 508 may allow the radar signal to pass only from the converter 506 to the antenna 502, and may allow the received reflection of the radar signal to pass only from the antenna 502 to the mixer 510.

The mixer may receive a copy of the radar signal from the converter 510 and may receive the reflection of the radar signal from the circulator 508. The mixer 510 may combine the original radar signal with the reflected radar signal, resulting in an output signal having a relatively low frequency of between 1 KHz and 1 MHz.

A receiver 512 may include a logic device capable of determining data based on the output signal. In that regard, the receiver 512 may receive the output signal and may determine data based on the output signal.

An advantage of using optical devices as compared to radar devices is that optical devices are relatively small. In that regard, it may be desirable to utilize optical devices instead of radar devices in order to optimize space.

Figure 5B:
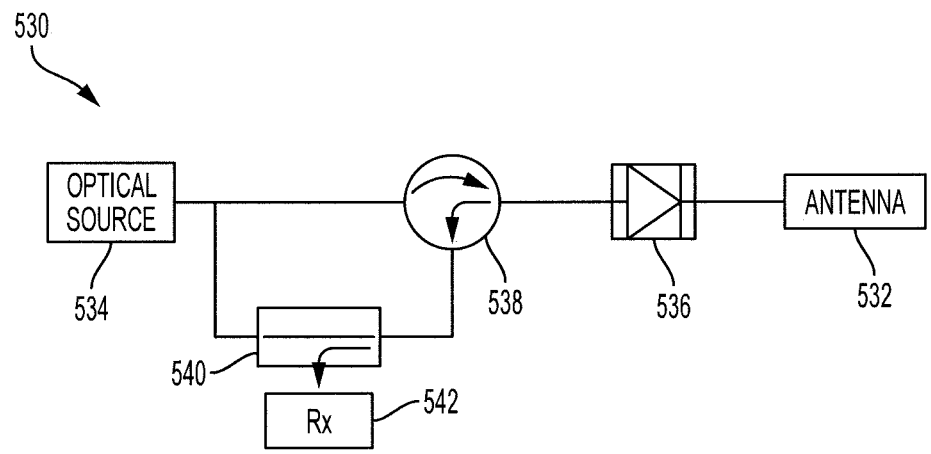

Turning now to FIG. 5B, another system 530 may be utilized to form a radar signal. The system 530 may include similar components as the system 500 with a greater quantity of optical devices and fewer radar devices. In particular, the system 530 includes an optical source 534 that transmits a light signal. The light signal may be received by an optical circulator 538 and then converted to a radar signal by a converter 536. The radar signal may be output by the antenna 532.

A reflection of the radar signal may be received by the antenna 532 and may be converted into a light signal by the converter 536. The light signal may be received by the optical circulator 538 where it is transferred to a hybrid coupler 540. The hybrid coupler 540 may further be an optical device. The hybrid coupler 540 may combine the light signal from the optical source 534 and the light signal from the circulator 538. The output of the hybrid coupler 540 may be an output signal having a frequency of between 1 kHz and 1 MHz. The output signal may be received by a receiver 542 which may determine data based on the output signal.

Figure 5C:
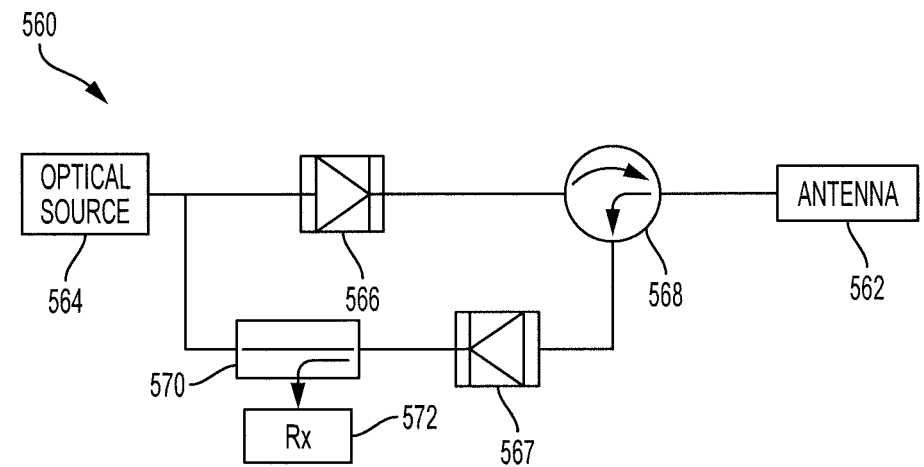

Referring now to FIG. 5C, another system 560 may be utilized to form a radar signal. As with the system 530, the system 560 may include a greater quantity of optical devices and fewer radar devices than the system 500. In particular, an optical source 564 may transmit a light signal. A converter 566 may convert the light signal to a radar signal. A circulator 508 may transmit the radar signal to the antenna 562 for transmission into the environment.

A reflection of the radar signal may be received by the antenna 562. The reflection of the signal may be transferred through the circulator 568 to the converter 567, where it is converted to a light signal. A hybrid coupler 570 may combine the original light signal to the light signal received from the converter 567, resulting in an output signal. A receiver 572 may determine data based on the output signal.

Figure 6:
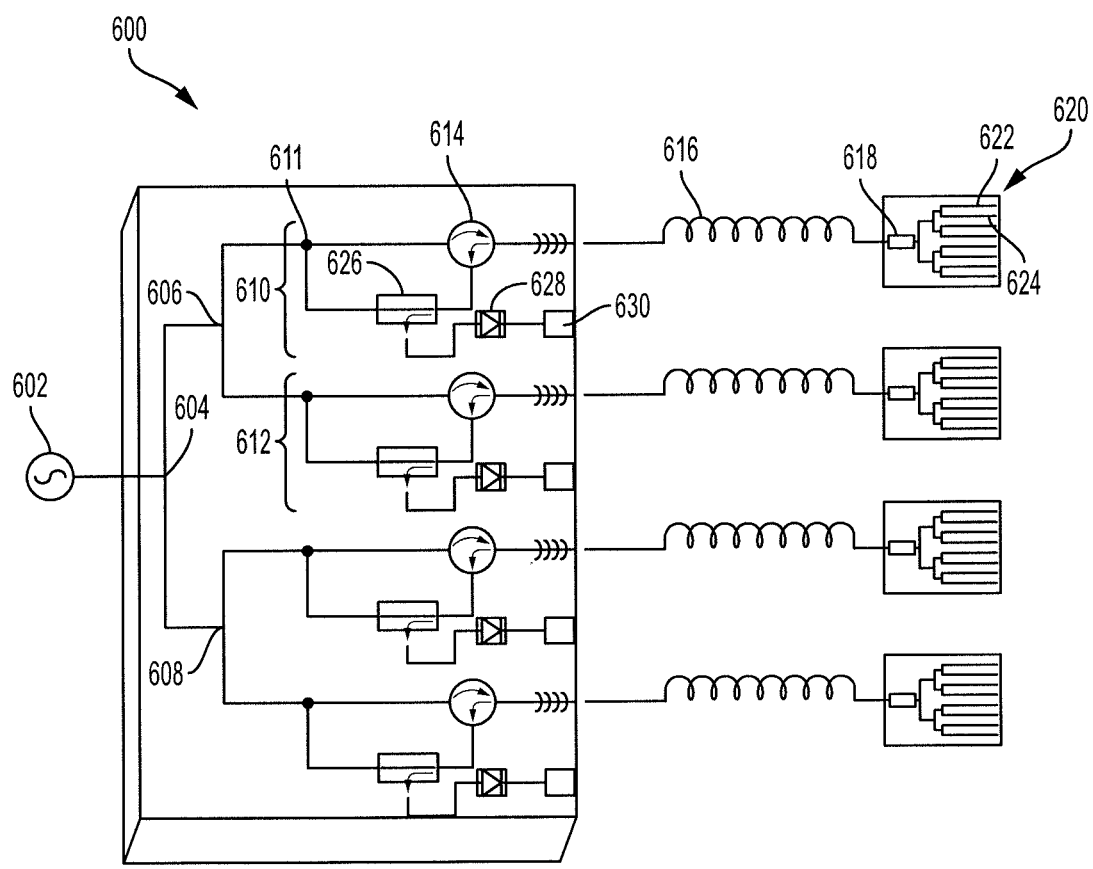
FIG. 6 is a drawing of a radar system designed to generate multiple radar signals using a single optical source according to an embodiment of the present invention.

Turning now to FIG. 6, a radar system 600 is capable of transmitting multiple radar signals using a single optical source 602. The radar system 600 includes multiple subsystems including a first subsystem 610 and a second subsystem 612. Each of the subsystems of the radar system 600 includes similar features as the system 530 of FIG. 5B.

An optical splitter 604 may receive the optical signal from the optical source 602. The optical splitter 604 may include a branched fiber-optic line that receives the optical signal and outputs duplicates of the optical signal. For example, the optical splitter 604 outputs two duplicates of the optical signal from the optical source 602. Where used in this context, a fiber-optic line corresponds to a fiber or other transmission line capable of transmitting and optical signal. For example, a fiber-optic line may include a plastic-based fiber.

A second optical splitter 606 and a third optical splitter 608 each receive one of the duplicates from the first optical splitter 604. Each of the second optical splitter 606 and the third optical splitter 608 split the corresponding duplicate signal into two copies of the duplicate signal. Each copy of a duplicate signal is received by one of the subsystems. For example, one of the copies output by the second optical splitter 606 is received by the first subsystem 610 and the other copy is received by the second subsystem 612.

Although the optical splitters 604, 606, 608 are shown to split a received signal into two duplicate signals, one skilled in the art will realize that an optical splitter may split an optical signal into any quantity of duplicate signals.

The first subsystem 610 includes a fourth optical splitter 611. The fourth optical splitter 611 splits the copy of the duplicate signal received by the second optical splitter 606 into another pair of duplicate signals. One of the duplicate signals is received by a circulator 614 where it is transmitted over a fiber-optic line 616 to a converter. The converter 618 converts the optical duplicate signal into a radar signal which is then split into multiple radar signals and transmitted by an antenna array 620. The antenna array includes a plurality of antennas including a first antenna 622 and a second antenna 624. Each antenna of the antenna array 620 may transmit one of the multiple radar signals.

Each antenna of the antenna array may receive a reflection of one or more of the multiple radar signals. The reflection is then transmitted through the converter 618 where it is converted to an optical signal. The optical signal may then traverse the fiber-optic line 616 where it is transmitted to a hybrid coupler 626 by the circulator 614. The hybrid coupler 626 may combine the optical signal received from the circulator 614 with the other duplicate optical signal from the fourth optical splitter 611. The hybrid coupler 626 may then output an output signal corresponding to a difference between the original optical signal and the optical signal corresponding to the reflection. A detector 628 may receive the output signal and may detect data based on the output signal. A logic device 630 may receive the data detected by the detector 628 and may determine information corresponding to the environment based on the data detected by the detector 628.

While the radar system 600 may output a plurality of radar signals, the radar signals may not combine into a radar beam because each of the radar signals has the same phase. Thus, the radar system 600 may be unusable to scan an environment for objects.

Figure 7:
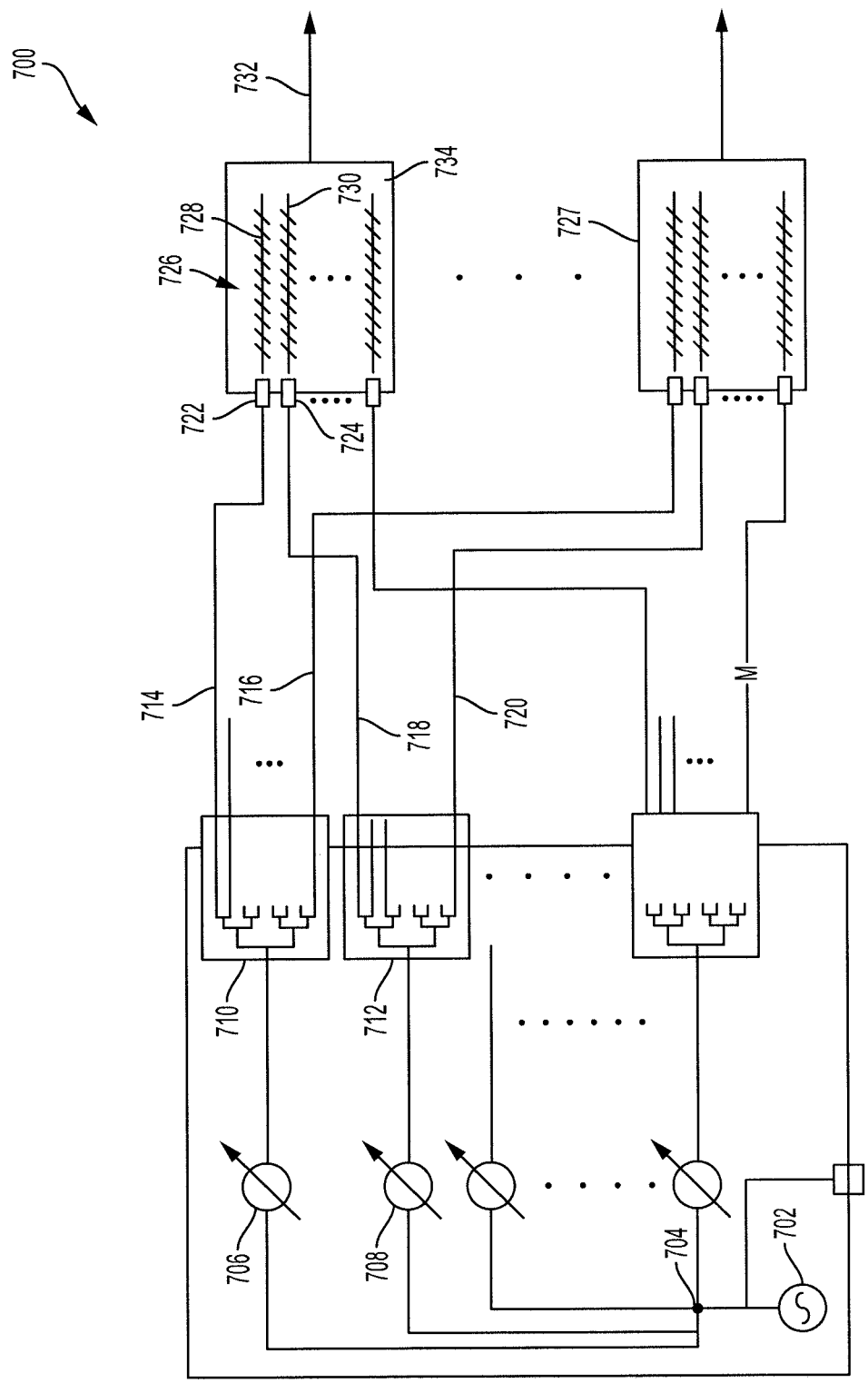
FIG. 7 is a drawing of a radar system designed to generate multiple radar beams using a single optical source and multiple phase shifters for shifting a phase of at least some optical signals according to an embodiment of the present invention.

Turning now to FIG. 7, another radar system 700 may be used to transmit multiple radar beams. The radar system 700 includes an optical source 702 and a first optical splitter 704. The optical source 702 outputs an optical signal which is split into multiple duplicate signals by the first optical splitter 704. Each of the duplicate signals may be received by a phase shifter. For example, a first duplicate signal may be received by a first phase shifter 706 and a second duplicate signal may be received by a second phase shifter 708. The first phase shifter 706 may shift the phase of the received signal by a different amount the second phase shifter 708. In that regard, each of the phase shifters may shift the phase of their corresponding signals by a different amount.

The radar system 700 further includes secondary optical splitters that each split a phase-shifted duplicate into multiple signal copies. For example, the radar system 700 includes a second optical splitter 710 that splits the phase-shifted duplicate signal received from the first phase shifter 706 into a set of phase-shifted signal copies. Likewise, the radar system 700 includes a third optical splitter 712 that splits the phase-shifted duplicate signal received from the second phase shifter 708 into a set of phase-shifted signal copies.

For example, the second optical splitter 710 may output a plurality of optical signal copies including a first optical signal 714 and a second optical signal 716. The first optical signal 714 and the second optical signal 716 may each have the same phase. Likewise, the third optical splitter 712 may output a plurality of optical signal copies including a third optical signal 718 and a fourth optical signal 720. The third optical signal 718 and the fourth optical signal 720 may each have the same phase, which may be different than the phase of the first optical signal 714 and the second optical signal 760.

The radar system 700 may further include a plurality of antenna arrays including a first antenna array 726 and a second antenna array 727. Each antenna array 726, 727 may have a plurality of antennas. For example, the first antenna array 726 includes a first antenna 728 and a second antenna 730. Furthermore, a converter may be positioned upstream from each antenna of each antenna array 726, 727. For example, a first converter 722 may be positioned upstream from the first antenna 728 (i.e., between the second optical splitter 710 and the first antenna 728) and a second converter 724 may be positioned upstream from the second antenna 730.

The antenna array 726 may be designed to output a radar beam 732. In order for the radar beam 732 to be generated, each antenna of the antenna array 726 may transmit a radar signal having a different phase. In that regard, it may be desirable for each antenna array to receive one of the optical signal copies from each of the secondary optical splitters (i.e., the optical splitters positioned downstream from the phase shifters). For example, it may be desirable for the first antenna array 726 to receive one Optical signal copy from the second optical splitter 710 and one optical signal copy from the third optical splitter 712.

In particular, the first antenna array 726 may receive a radar signal copy of the first optical signal 714 from the second optical splitter 710, and may receive a radar signal copy of the third optical signal 718 from the third optical splitter 712. Likewise, the second antenna array 727 may receive a radar signal copy of the second optical signal 716 from the second optical splitter 710, and may receive a radar signal copy of the fourth optical signal 720 from the third optical splitter 712.

The converters may be positioned on a same PCB as their corresponding antennas, or may be positioned relatively near to their corresponding antennas. Where used in this context, relatively near may correspond to a location within 5 mm, within 50 mm, within 5 cm, within 10 cm, or the like. For example, the first antenna array 726 may be positioned on a PCB 734. The first converter 722 and the second converter 724 may also be positioned on the PCB 734. By positioning the converters relatively close to the corresponding antennas, unintentional delay may not be applied to the radar signals. Furthermore, because the other communication lines utilize fiber-optic lines, the optical source 702 may be positioned relatively far from the converters without delay being introduced by the fiber-optic lines.

As described above, the radar system 700 may be capable of transmitting multiple radar beams that are each signal off of a single optical source 702. However, the radar system 700 does not include capabilities for receiving or analyzing reflections of the radar beams.

Figure 8:
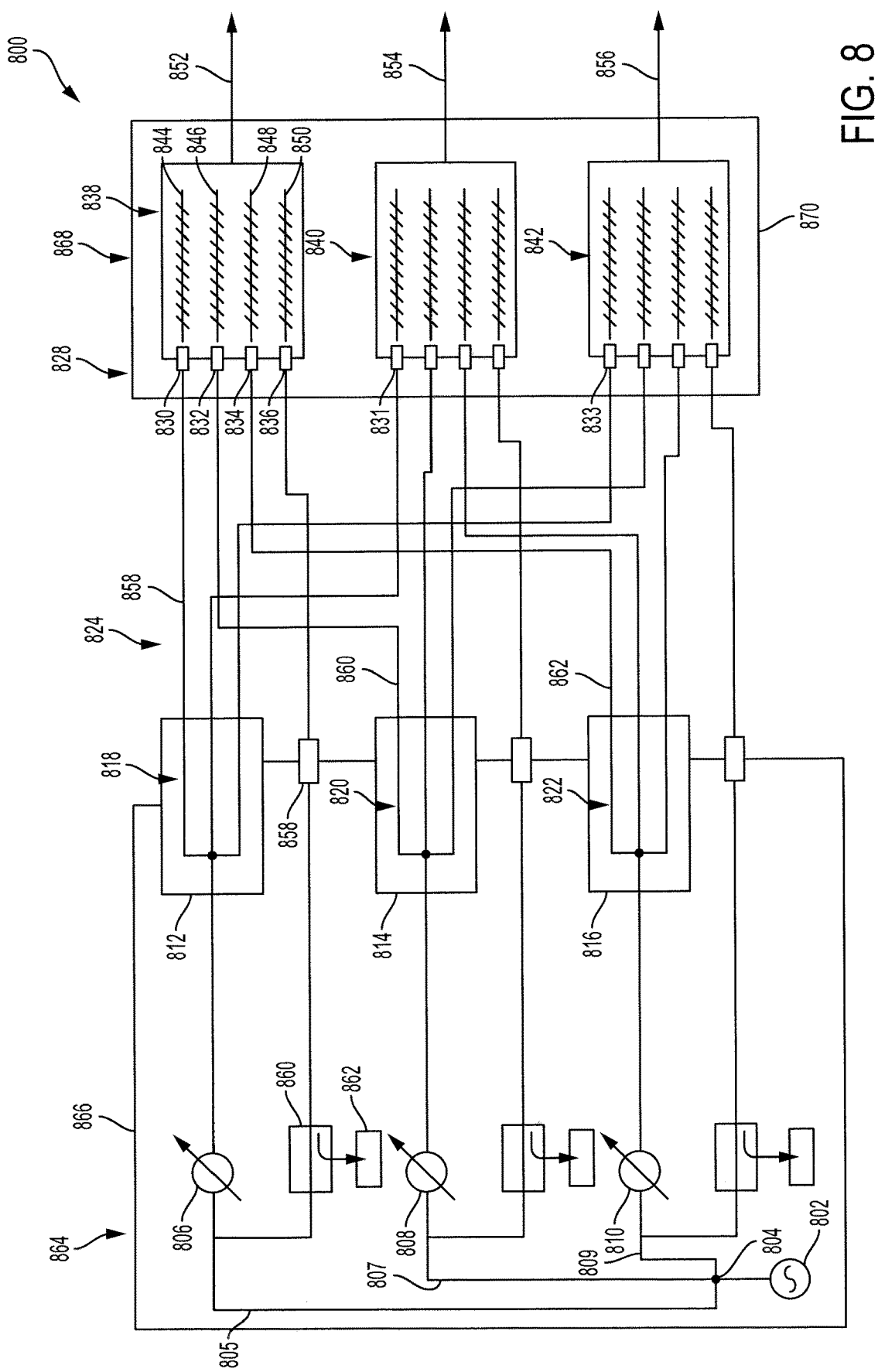
FIG. 8 is a drawing of a radar system designed to transmit radar beams, receive reflections of the radar beams, and detect objects in the environment based on the reflections of the radar beams using a single optical source and multiple phase shifters according to an embodiment of the present invention.

In that regard and referring to FIG. 8, a radar system 800 may transmit multiple radar beams based on a single optical source 802 and may receive and analyze reflections of the radar beams. The radar system 800 includes a first optical splitter 804. The first optical splitter 804 may split the optical signal generated by the optical source 802 into three duplicates signals including a first duplicate signal 805, a second duplicate signal 807, and a third duplicate signal 809.

The radar system 800 further includes three phase shifters including a first phase shifter 806, a second phase shifter 808, and a third phase shifter 810. Each of the phase shifters 806, 808, 810 may receive one of the duplicates signals 805, 807, 809. In particular, the first phase shifter 806 may receive the first duplicate signal 805, the second phase shifter 808 may receive the second duplicate signal 807, and the third phase shifter 810 may receive the third duplicate signal 809. In some embodiments, the system 800 may include additional optical splitters positioned between the first optical splitter 804 and each of the phase shifters 806, 808, 810.

Each of the first phase shifter 806, the second phase shifter 808, and the third phase shifter 810 may shift the phase of the corresponding duplicate signal by a different amount. For example, the first phase shifter 806 may shift the phase of the first duplicate signal 805 by $\pi_3$, the second phase shifter 808 may shift the phase of the second duplicate signal 807 by $2\pi_3$, and the third phase shifter 810 may shift the phase of the third duplicate signal 809 by $\pi$. A radar system may include any quantity of phase shifters. In that regard, each of the phase shifters may shift the phase of the corresponding duplicate signal by a different value.

The radar system 800 may further include multiple secondary optical splitters including a second optical splitter 812, a third optical splitter 814, and a fourth optical splitter 816. In some embodiments, a radar system may include a same quantity of secondary optical splitters as phase shifters.

Each of the secondary optical splitters may split a corresponding phase-shifted duplicate signal into a set of optical signal copies. For example, the second optical splitter 812 may split the phase-shifted first duplicate signal 805 into a first set of optical signal copies 818 which includes 3 copies of the phase-shifted first duplicate signal 805. In that regard, each of the first set of optical signal copies 818 may be referred to as a duplicate signal as it includes the same material as the first duplicate signal 805 although the phase has been shifted. Likewise, the third optical splitter 814 may split the phase-shifted second duplicate signal 807 into a second set of optical signal copies 820. Similarly, the fourth optical splitter 816 may split the phase-shifted third duplicate signal 809 into a third set of optical signal copies 822.

The radar system 800 may further include a plurality of fiber-optic lines 824 that connects each optical signal copy to at least one converter 828. For example, one of the plurality of fiber-optic lines 824 connects one of the first set of optical signal copies 818 to a first converter 830, one of the plurality of fiber-optic lines 824 connects one of the second set of optical signal copies 818 to a second converter 832, and one of the plurality of fiber-optic lines 824 connects one of the third set of optical signal copies 820 to a third converter 834. In some embodiments, a single multichannel converter may be used instead of the combination of converters shown in FIG. 8.

The radar system 800 may further include a plurality of antenna arrays including a first antenna array 838, a second antenna array 840, and a third antenna array 842. In some embodiments, each antenna of the antenna arrays 838, 840, 842 may be end-fire antennas and, in some embodiments, each antenna may be an antenna other than an end-fire antenna, such as a broadside antenna.

Each antenna array may include multiple antennas. For example, the first antenna array 838 includes a first transmit antenna 844, a second transmit antenna 846, a third transmit antenna 848, and a receive antenna 850. The converters may be positioned relatively near a corresponding antenna. For example, the first converter 830 may be positioned relatively near to the first transmit antenna 844. Each of the converters may output a radar signal, which may be referred to as a radar signal copy because it is a radar signal that corresponds to the a corresponding set of optical signal copies. In that regard, the second optical splitter 812 may output the first set of optical signal copies 818, one of which may be received by the first converter 830 and output as a first radar signal copy, another of which may be received by a fourth converter 831 and output as a second radar signal copy, and the last of which may be received by a fifth converter 833 and output as a third radar signal copy. In that regard, the combination of the first converter, the fourth converter 831, and the fifth converter 833 may output a set of radar signal copies.

Each antenna array may be designed to transmit a radar beam. For example, the first antenna array 838 may transmit a first radar beam 852, the second antenna array 840 may transmit a second radar beam 854, and the third antenna array 842 may transmit a third radar beam 856. In that regard, it is desirable for each of the antenna arrays to transmit radar signals having different phases. In order to achieve this effect, the plurality of fiber-optic lines 824 may transfer one optical signal copy from each set of optical signal copies to each antenna array.

For example, a first fiber-optic line 858 may transfer one of the first set of optical signal copies 818 to the first converter 830. The first set of optical signal copies 818 has a first phase shift. The first converter 830 converts the optical signal copy from the first fiber-optic line 858 into a radar signal, which may be transmitted by the first transmit antenna 844. Likewise, a second fiber-optic line 860 may transfer one of the second set of optical signal copies 820 to the second converter 832. The second set of optical signal copies 820 has a second phase shift that is different than the first phase shift. The second converter 832 converts the optical signal copy from the second fiber-optic line 860 into a radar signal, which may be transmitted by the second transmit antenna 846. Likewise, a third fiber-optic line 862 may transfer one of the third set of optical signal copies 822 to the third converter 834. The third set of optical signal copies 822 has a third phase shift that is different than the first phase shift and the second phase shift. The third converter 834 converts the optical signal copies from the third fiber-optic line 862 into a radar signal, which may be transmitted by the third transmit antenna 848. In that regard, each of the optical signal copies transmitted by the first transmit antenna 844, the second transmit antenna 846, and the third transmit antenna 848 may have a different phase and, thus, be combined and transmitted as the first radar beam 852.

In a similar manner, each of the second antenna array 840 and the third antenna array 842 may transmit an optical signal copy from each of the first set of optical signal copies 818, the second set of optical signal copies 820, and the third set of optical signal copies 822. In that regard, each of the antenna arrays 838, 840, 842 may transmit 3 radar signals having different phases, the 3 radar signals from each antenna array 838, 840, 842 being combinable into a radar beam.

Each of the antenna arrays 838, 840, 842 may further include one or more receive antenna. For example, the first antenna array 838 includes a receive antenna 850. The receive antenna 850 may receive a reflection of one or more of the first radar beam 852, the second radar beam 854, and/or the third radar beam 856.

The reflected signal received by the receive antenna 850 may be transferred to a receive converter 836 where it may be converted to a received optical signal. A receiver 858 may be designed to receive the received optical signal from the receive converter 836. The received optical signal may be combined with the first duplicate signal 805 within a hybrid coupler 860. A result of the combination may correspond to a difference between the first duplicate signal 805 and the received optical signal. In that regard, the hybrid coupler 860 may output an output signal that is a relatively low frequency signal. Stated differently, the hybrid coupler 860 may output a low-frequency signal that has a frequency of between approximately 1 kHz and approximately 1 MHz.

The low-frequency signal from the hybrid coupler 860 may be received by a detector 862. The detector 862 may detect data based on the low-frequency signal. For example, the detector 862 may determine the presence of objects within an environment of the radar system 800 based on the low-frequency signal from the hybrid coupler 860.

Various components of the radar system 800 may be combined into one or more packages. For example, some or all of the optical devices may be positioned or formed on a single integrated circuit 864 and implemented within a chip 866 due to the relatively small size of optical devices. As shown in FIG. 8, the optical source 802, the optical splitters 804, 812, 814 816, the phase shifters 806, 808, 810, the hybrid coupler's 860, and the detectors 862 are each optical devices and thus positioned on the integrated circuit 864 and packaged within the chip 866.

Likewise, each of the antenna arrays 838, 840, 842 may be individually positioned on a separate PCB and packaged within a radar subsystem 868. For example, the antenna arrays 838, 840, 842 may be stacked above each other and packaged within a housing 870.

Referring now to FIGS. 4 and 8, the antenna arrays of the radar system 800 may be oriented in various manners. For example, the antenna arrays 838, 840, 842 of the radar system 800 may be stacked on top of each other such that they may perform volumetric scanning in a similar manner as the first set of end-fire antenna arrays 402. As another example, the antenna arrays 838, 840, 842 may each be oriented in a different direction to increase a field of view of the radar system 800. In that regard, the first antenna array 838 may replace the first set of end-fire antenna arrays 402, the second antenna array 840 may replace the second set of end-fire antenna arrays 404, and the third antenna array 842 may replace the third set of end-fire antenna arrays 406.

In some embodiments, the radar system 800 may include additional antenna arrays. For example, the radar system 800 may include nine total antenna arrays. In that regard, the radar system 800 may be oriented in a similar manner as the vehicular radar system 400 of FIG. 4 such that it may detect three-dimensional data with a 360 degree field of view. In that regard, the vehicular radar system 400 may be implemented using a single optical source and may be relatively compact due to the use of the single optical source and the fact that the only non-optical (i.e., relatively large) components are the antennas and the converters.

Figure 9:
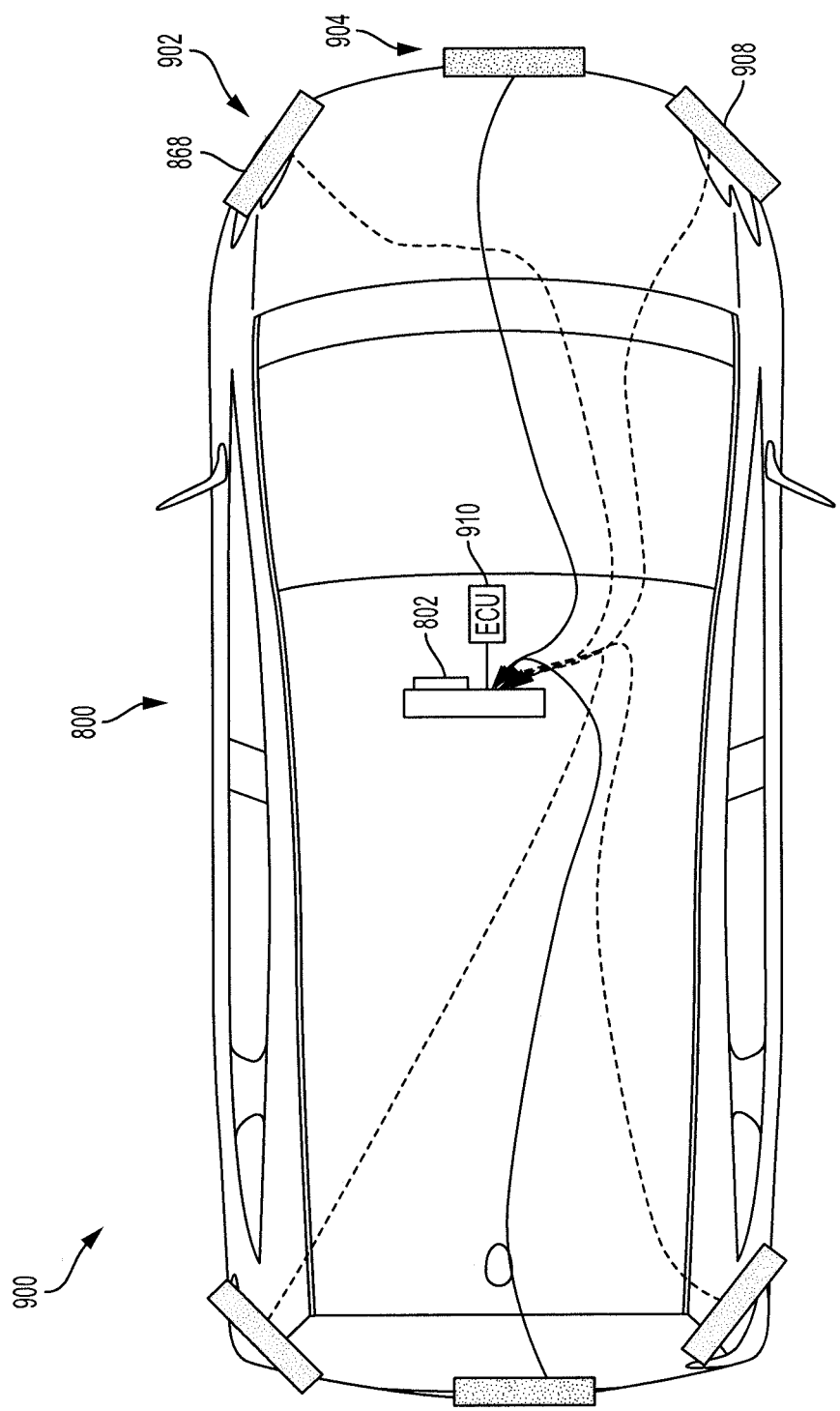
FIG. 9 is a drawing of a vehicle including the radar system of FIG. 8 and multiple LIDAR subsystems capable of transmitting LIDAR signals using the single optical source according to an embodiment of the present invention.

Referring now to FIG. 9, a vehicle 900 is shown. The vehicle 900 includes the radar system 800 including the optical source 802. The radar system 800 may include additional components other than those illustrated in FIG. 8. In particular, the radar system 800 may include multiple radar subsystems 902 including the radar subsystem 868 and another radar subsystem 908. Similarly, the radar system 800 may further include one or more LIDAR subsystem 904. The LIDAR subsystem 904 may receive an optical signal from the optical source 802 and may transmit and receive LIDAR signals. In that regard, the optical source 802 may be used not only for the generation of radar signals but also for the generation of LIDAR signals. In that regard, the vehicle 900 may include multiple radar subsystems 902 and multiple LIDAR subsystems 904 that each operates based on the single optical source 802.

The vehicle 900 may further include an ECU 910. The ECU 910 maybe coupled to the radar system 800. The ECU 910 may receive data from each of the detectors of the radar system 800 and may determine the presence of objects based on the received data. In some embodiments, the radar system 800 may include an RFIC that performs this functionality instead of or in addition to the ECU 910. In such embodiments, the ECU 910 may receive data from the RFIC indicating the presence of objects in the environment of the vehicle 900.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicular radar system comprising:
an optical source configured to output an optical signal;
a first optical splitter coupled to the optical source and configured to split the optical signal into a first duplicate signal and a second duplicate signal;
at least one converter coupled to the first optical splitter and configured to convert the first duplicate signal and the second duplicate signal into a first radar signal and a second radar signal, respectively;
a first antenna coupled to the at least one converter and configured to transmit the first radar signal, and a second antenna coupled to the at least one converter and configured to transmit the second radar signal; and
a circulator located between the optical source and the first antenna and configured to facilitate transmission of at least one of the first duplicate signal or the first radar signal to the first antenna, to prevent transmission of the at least one of the first duplicate signal or the first radar signal through the circulator to a receiver, and to facilitate transmission of a reflected radar signal received by the first antenna towards the receiver.

2. The vehicular radar system of claim 1 further comprising a phase shifter coupled to the first optical splitter and configured to shift a phase of the first duplicate signal such that the first duplicate signal and the first radar signal have a different phase than the second duplicate signal and the second radar signal, respectively.

3. The vehicular radar system of claim 2 further comprising:
a second optical splitter coupled to the phase shifter and configured to split the first duplicate signal that is phase-shifted into a first pair of optical signal copies; and
a third optical splitter configured to split the second duplicate signal into a second pair of optical signal copies,
wherein the at least one converter is configured to convert the first pair of optical signal copies and the second pair of optical signal copies into radar signals.

4. The vehicular radar system of claim 3 further comprising a third antenna and a fourth antenna, wherein:
the first antenna is configured to transmit one of the first pair of optical signal copies and the second antenna is configured to transmit one of the second pair of optical signal copies such that the first antenna and the second antenna together transmit a first radar beam; and
the third antenna is configured to transmit another of the first pair of optical signal copies and the fourth antenna is configured to transmit another of the second pair of optical signal copies such that the third antenna and the fourth antenna together transmit a second radar beam.

5. The vehicular radar system of claim 4 wherein the first antenna and the second antenna are stacked above the third antenna and the fourth antenna such that a combination of the first radar beam and the second radar beam forms a three-dimensional radar beam.

6. The vehicular radar system of claim 4 wherein the first antenna and the second antenna are oriented in a different direction than the third antenna and the fourth antenna such that the first radar beam is usable to scan in a first direction and the second radar beam is usable to scan in a second direction.

7. The vehicular radar system of claim 3 wherein the first optical splitter, the phase shifter, the second optical splitter, and the third optical splitter are positioned on a single integrated circuit within a chip.

8. The vehicular radar system of claim 1 further comprising:
a receive antenna configured to receive a reflection of the first radar signal and of the second radar signal;
a receive converter configured to convert the reflection of the first radar signal and of the second radar signal into a received optical signal; and
an optical coupler configured to combine the reflection of the first radar signal and of the second radar signal with at least one of the optical signal, the first duplicate signal, or the second duplicate signal to create a low-frequency signal usable to detect an object that caused the reflection of the first radar signal and of the second radar signal.

9. The vehicular radar system of claim 1 further comprising a LIDAR transmitter configured to transmit a LIDAR signal and receive a reflection of the LIDAR signal, wherein the first optical splitter is further configured to split the optical signal into a third duplicate signal and the LIDAR signal is generated using the third duplicate signal.

10. A vehicular radar system comprising:
an optical source configured to output an optical signal;
a first optical splitter coupled to the optical source and configured to split the optical signal into a first duplicate signal and a second duplicate signal;
a phase shifter coupled to the first optical splitter and configured to shift a phase of the first duplicate signal such that the first duplicate signal has a different phase than the second duplicate signal;
at least one converter coupled to the first optical splitter and the phase shifter and configured to convert the first duplicate signal that is phase-shifted and the second duplicate signal into a first radar signal and a second radar signal, respectively;
a first antenna array coupled to the at least one converter and configured to transmit a first radar beam including the first radar signal and the second radar signal; and
a circulator located between the optical source and the first antenna array and configured to facilitate transmission of at least one of the first duplicate signal or the first radar signal to the first antenna array, to prevent transmission of the at least one of the first duplicate signal or the first radar signal through the circulator to a receiver, and to facilitate transmission of a reflected radar signal received by the first antenna array towards the receiver.

11. The vehicular radar system of claim 10 further comprising:
a second optical splitter coupled to the phase shifter and configured to split the first duplicate signal that is phase-shifted into a first pair of optical signal copies; and
a third optical splitter configured to split the second duplicate signal into a second pair of optical signal copies,
wherein the at least one converter is configured to convert the first pair of optical signal copies and the second pair of optical signal copies into radar signals.

12. The vehicular radar system of claim 11 further comprising a second antenna array, wherein:
the first antenna array is configured to transmit the first radar beam that includes one of the first pair of optical signal copies and one of the second pair of optical signal copies; and the second antenna array is configured to transmit a second radar beam that includes another of the first pair of optical signal copies and another of the second pair of optical signal copies.

13. The vehicular radar system of claim 10 further comprising:
a receive antenna configured to receive a reflection of the first radar beam;
a receive converter configured to convert the reflection of the first radar beam into a received optical signal; and
an optical coupler configured to combine the reflection of the first radar beam with at least one of the optical signal, the first duplicate signal, or the second duplicate signal to create a low-frequency signal usable to detect an object that caused the reflection of the first radar beam.

14. The vehicular radar system of claim 10 further comprising a LIDAR transmitter configured to transmit a LIDAR signal and receive a reflection of the LIDAR signal, wherein the first optical splitter is further configured to split the optical signal into a third duplicate signal and the LIDAR signal is generated using the third duplicate signal.

15. A vehicular radar system comprising:
an optical source configured to output an optical signal;
a first optical splitter coupled to the optical source and configured to split the optical signal into a first duplicate signal and a second duplicate signal;
a phase shifter coupled to the first optical splitter and configured to shift a phase of the first duplicate signal such that the first duplicate signal has a different phase than the second duplicate signal;
a second optical splitter coupled to the phase shifter and configured to split the first duplicate signal that is phase-shifted into a first pair of optical signal copies;
a third optical splitter configured to split the second duplicate signal into a second pair of optical signal copies,
at least one converter coupled to the second optical splitter and to the third optical splitter and configured to convert the first pair of optical signal copies to a first pair of radar signal copies and to convert the second pair of optical signal copies into a second pair of radar signal copies;
a first antenna array coupled to the at least one converter and configured to transmit a first radar beam including one of the first pair of radar signal copies and one of the second pair of radar signal copies, and a second antenna array coupled to the at least one converter and configured to transmit a second radar beam including another of the first pair of radar signal copies and another of the second pair of radar signal copies; and
a circulator located between the optical source and the first antenna array and configured to facilitate transmission of at least one of the first pair of optical signal copies or the first pair of radar signal copies to the first antenna array, to prevent transmission of the at least one of the first pair of optical signal copies or the first pair of radar signal copies through the circulator to a receiver, and to facilitate transmission of a reflected radar signal received by the first antenna array towards the receiver.

16. The vehicular radar system of claim 15 wherein the at least one converter includes at least a first converter coupled to the first antenna array and at least a second converter coupled to the second antenna array.

17. The vehicular radar system of claim 15 further comprising:
a receive antenna configured to receive a reflection of the first radar beam;
a receive converter configured to convert the reflection of the first radar beam into a received optical signal; and
an optical coupler configured to combine the reflection of the first radar beam with at least one of the optical signal, the first duplicate signal, or the second duplicate signal to create a low-frequency signal usable to detect an object that caused the reflection of the first radar beam.

18. The vehicular radar system of claim 17 wherein the first optical splitter, the phase shifter, the second optical splitter, the third optical splitter, and the optical coupler are positioned on a single integrated circuit within a chip.

19. The vehicular radar system of claim 15 wherein the first antenna array is stacked above the second antenna array such that a combination of the first radar beam and the second radar beam forms a three-dimensional radar beam.

20. The vehicular radar system of claim 15 wherein the first antenna array is oriented in a different direction than the second antenna array such that the first radar beam is usable to scan in a first direction and the second radar beam is usable to scan in a second direction.

* * * * *